(12) United States Patent
Su

(10) Patent No.: US 6,808,186 B1
(45) Date of Patent: Oct. 26, 2004

(54) WHEEL STRUCTURE FOR A GOLF BAG

(76) Inventor: Po-Tang Su, No. 41, Lane 38, Jui Long Rd., Fongsan City, Kaohsiung Hsien (TW)

(*) Notice: Subject to any disclaimer, the term of this patent is extended or adjusted under 35 U.S.C. 154(b) by 0 days.

(21) Appl. No.: 10/270,637

(22) Filed: Oct. 16, 2002

(51) Int. Cl.[7] .......................... B62B 1/00; B60B 23/00; B25G 3/08
(52) U.S. Cl. .............................. 280/47.26; 280/DIG. 6; 280/47.24; 301/111.01; 403/397
(58) Field of Search ...................... 280/47.26, DIG. 6, 280/47.24, 652; 301/111.01, 112, 113, 111.04, 111.03, 120–122; 403/1, 315, 316, 318, 319, 397

(56) References Cited

U.S. PATENT DOCUMENTS

| | | | | |
|---|---|---|---|---|
| 4,765,646 A | * | 8/1988 | Cheng | 280/651 |
| 5,277,480 A | * | 1/1994 | Chiu | 301/111.07 |
| 5,368,371 A | * | 11/1994 | Markling | 301/64.701 |
| 5,494,341 A | * | 2/1996 | Cheng | 301/111.06 |
| 5,716,107 A | * | 2/1998 | Parker et al. | 301/111.07 |
| 5,884,982 A | * | 3/1999 | Yemini | 301/111.03 |
| 6,354,670 B1 | * | 3/2002 | Cheng | 301/111.04 |
| 6,361,121 B1 | * | 3/2002 | Morris | 301/112 |
| 6,508,518 B1 | * | 1/2003 | Owen et al. | 301/111.03 |
| 2002/0038973 A1 | * | 4/2002 | Godwin | 301/111.04 |
| 2002/0192019 A1 | * | 12/2002 | Wack et al. | 403/316 |

FOREIGN PATENT DOCUMENTS

WO    WO 02/24472 A1 *  3/2002 ............ 301/111.01

* cited by examiner

Primary Examiner—Brian L. Johnson
Assistant Examiner—G B Klebe
(74) Attorney, Agent, or Firm—Troxell Law Office PLLC

(57) ABSTRACT

A wheel structure is constructed to include a wheel bracket connectable to the bottom cuff of a golf bag, a wheel axle inserted through axle holes of the wheel bracket, two wheels, two connectors respectively mounted in the center axle holes of the wheels and capped on the ends of the wheel axle, and two clamps respectively mounted in spacer blocks in the connector to secure the ends of the wheel axle to the connectors.

1 Claim, 7 Drawing Sheets

WHEEL STRUCTURE FOR A GOLF BAG

BACKGROUND AND SUMMARY OF THE INVENTION

The present invention relates to a golf bag and, more specifically, to a wheel structure for golf bag, which is easy to install, and inexpensive to manufacture.

FIG. 1 shows a wheel structure for golf bag according to U.S. Pat. No. Des. 385,114. This design of wheel structure comprises a wheel bracket 8 connectable to the bottom cuff of a golf bag 80, the wheel bracket 8 having two side frames 81 and two axle holes 811 respectively formed in the side frames 81 and axially aligned, two wheels 83, and two rivets 82 respectively fastened to the axle holes 811 of the side frames 81 of the wheel bracket 8 to pivotally secure the wheels 83 to the side frames 81. This design of wheel structure is not durable in use because the rivets 82 wear quickly with use.

FIG. 2 shows another prior art design of wheel structure for golf bag. According to this design, the wheel structure comprises a wheel bracket 9, the wheel bracket 9 comprises two hollow wheel holder frames 91, each wheel holder frame 91 having two axle holes 9111 respectively formed in two opposite sidewalls 911 thereof, two wheels 90, each wheel 90 having a center axle hole 901, a wheel axle 93 inserted through the axle holes 9111 of the wheel holder frames 91 of the wheel bracket 9 and the center axle hole 901 of each wheel 90 to support the wheels 90 in the wheel holder frames 91 of the wheel bracket 9, a plurality of axle bearings 902 respectively mounted in the ends of the center axle holes 901 of the wheels 90 to support the wheel axle 93 in the wheels 90, a plurality of washers 94 respectively mounted on the wheel axle 93 between the two opposite sidewalls 911 of each of the wheel holder frames 91 and two sides of each of the wheels 90, and two screw caps 95 respectively threaded onto the threaded ends 931 of the wheel axle 93 outside the wheel bracket 9 to secure the wheel axle 93 in place. This design of wheel structure for golf bag has numerous drawbacks as outlined hereinafter.

1. The use of the axle bearings 902, washers 94, and screw caps 95 greatly complicates the assembly procedure of the wheel structure and also increases the manufacturing cost of the wheel structure.
2. The inner threads of the screw caps 95 wear quickly with use. When the screw caps 95 start to wear, a high noise will be produced during moving of the wheel structure with the golf bag. If the screw caps 95 disconnected from the threaded ends 931 of the wheel axle 93, the wheels 90 will fall out of wheel axle 93.
3. Because the mounting and dismounting of the wheels 90 are complicated, the wheel diameter of the wheels 90 is limited to a small range.

The present invention has been accomplished to provide a wheel structure for golf bag, which eliminates the drawbacks of the aforesaid prior art designs. It is one object of the present invention to provide a wheel structure for golf bag, which is detachable. It is another object of the present invention to provide a wheel structure for golf bag, which is easy to assemble and disassemble. It is still another object of the present invention to provide a wheel structure for golf bag, which is easy and inexpensive to manufacture. To achieve these and other objects of the present invention, the wheel structure of golf bag comprises a wheel bracket connectable to the bottom cuff of a golf bag, a wheel axle inserted through two axle holes in two opposite side frames of the wheel bracket, two wheels, two connectors respectively mounted in the center axle hole of each of the wheels and capped onto the ends of the wheel axles, each connector an upper spacer block and a lower spacer block outwardly protruded from the head thereof and an outer cap fixedly connected to the spacer blocks and arranged in parallel to the head, and two clamps fastened to the upper and lower spacer blocks of the connectors and detachably engaging a respective annular groove of the wheel axle to secure the wheel axle to the connectors.

DETAILED DESCRIPTION OF THE PREFERRED EMBODIMENT

Figure 1:
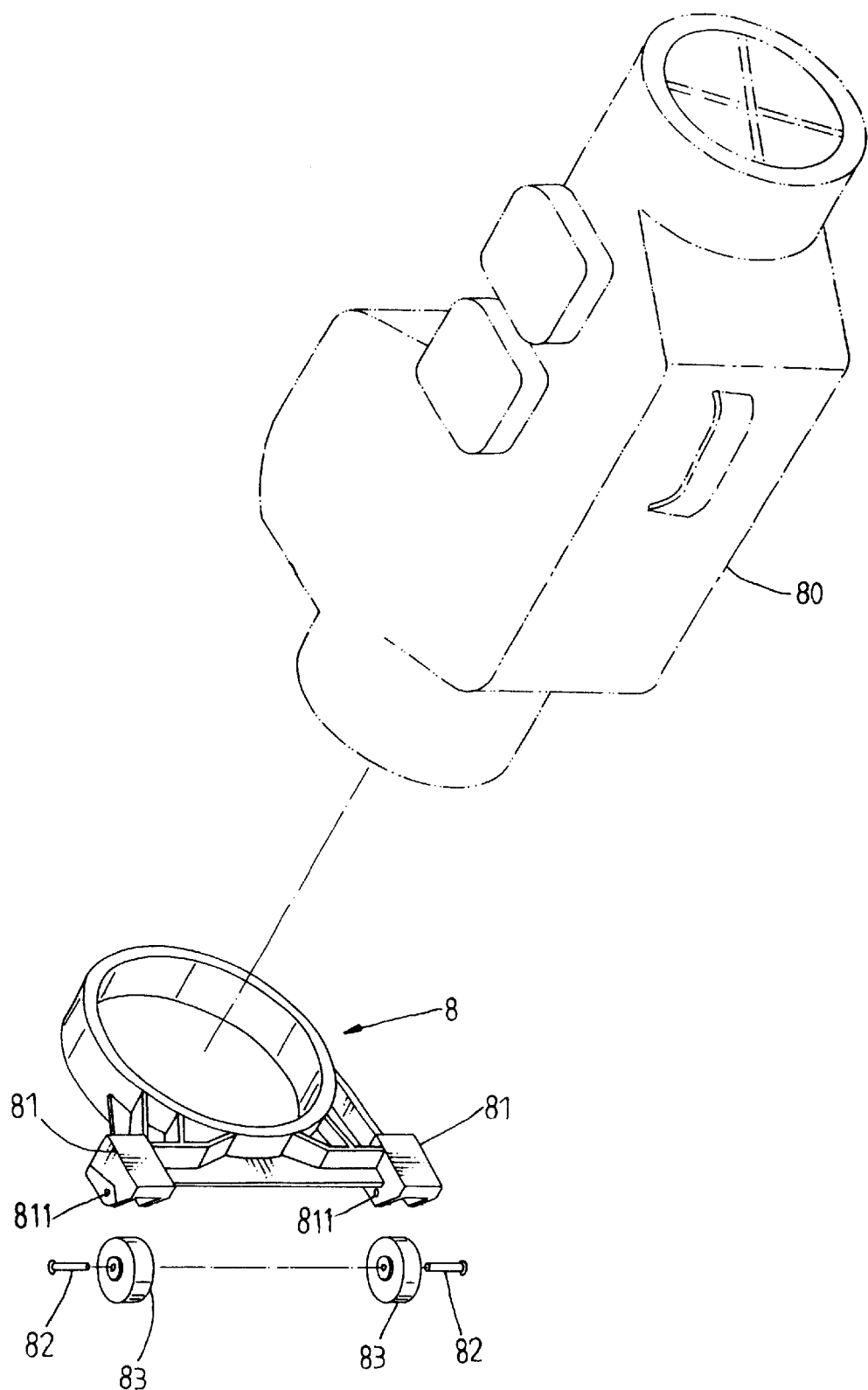
FIG. 1 is an exploded view of a wheel structure for golf bag according to the prior art.
Figure 2:
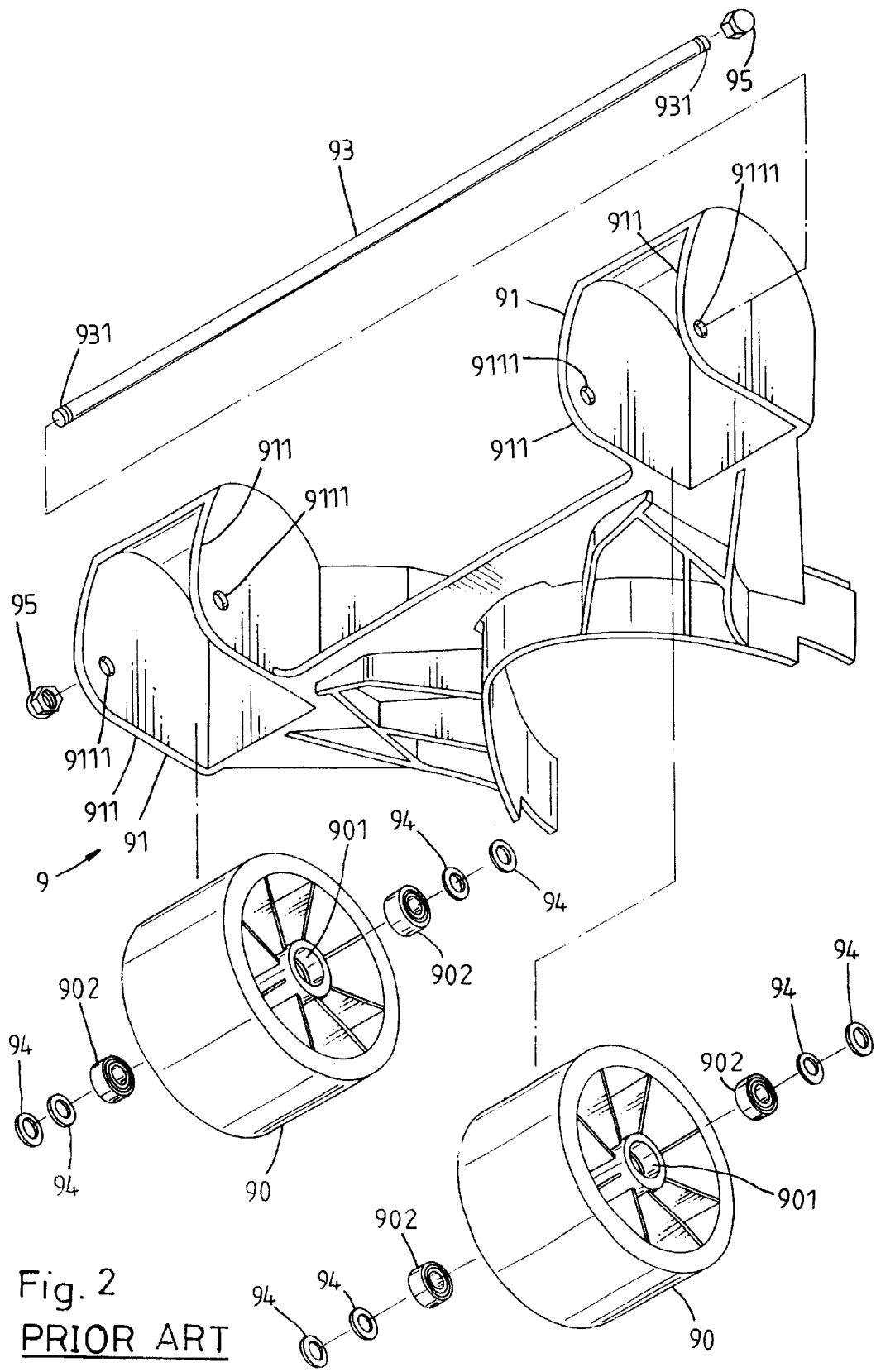
FIG. 2 is an exploded view of another design of wheel structure for golf bag according to the prior art.
Figure 3:
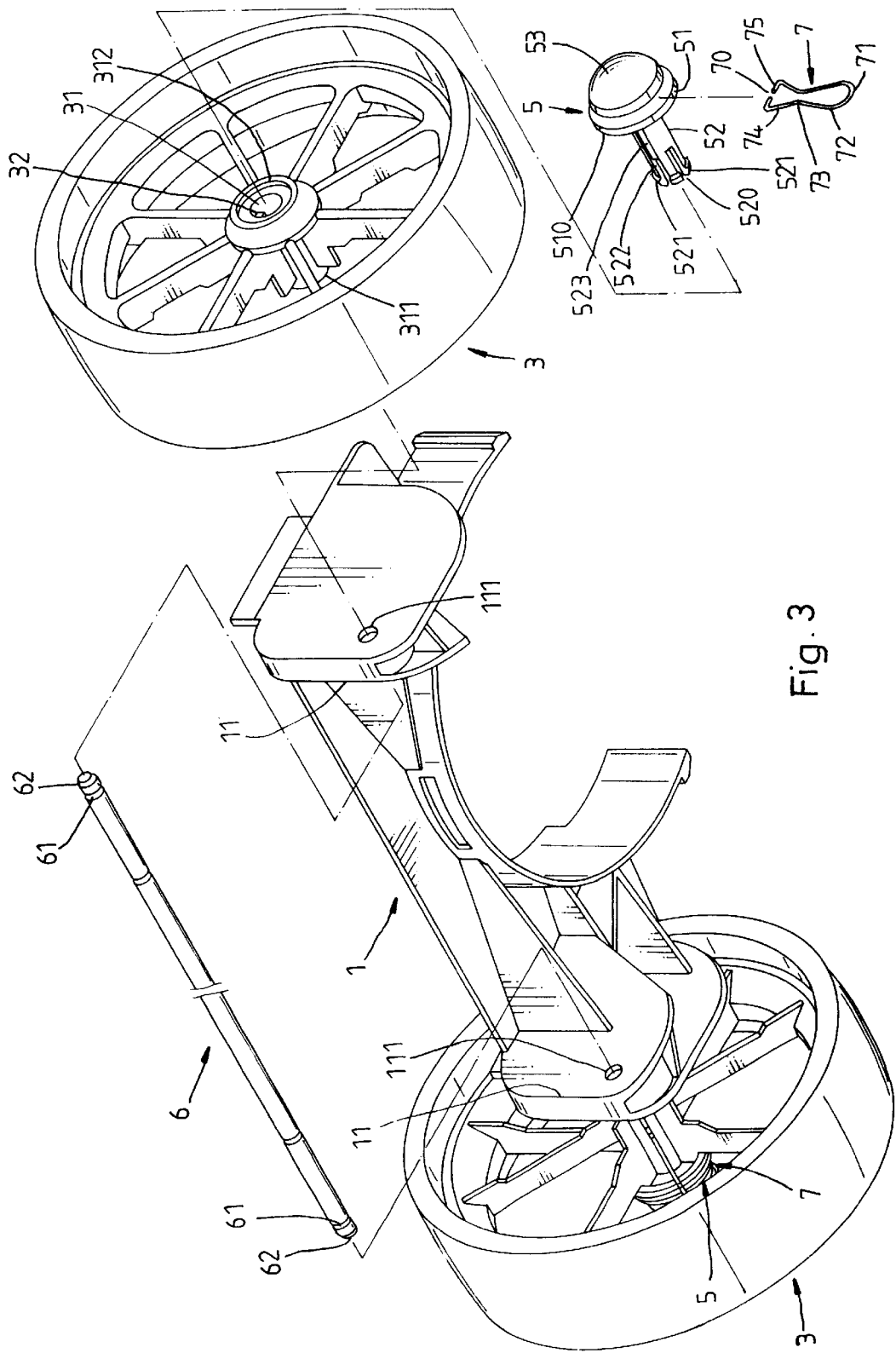
FIG. 3 is an exploded view of a wheel structure for golf bag according to the present invention.
Figure 4:
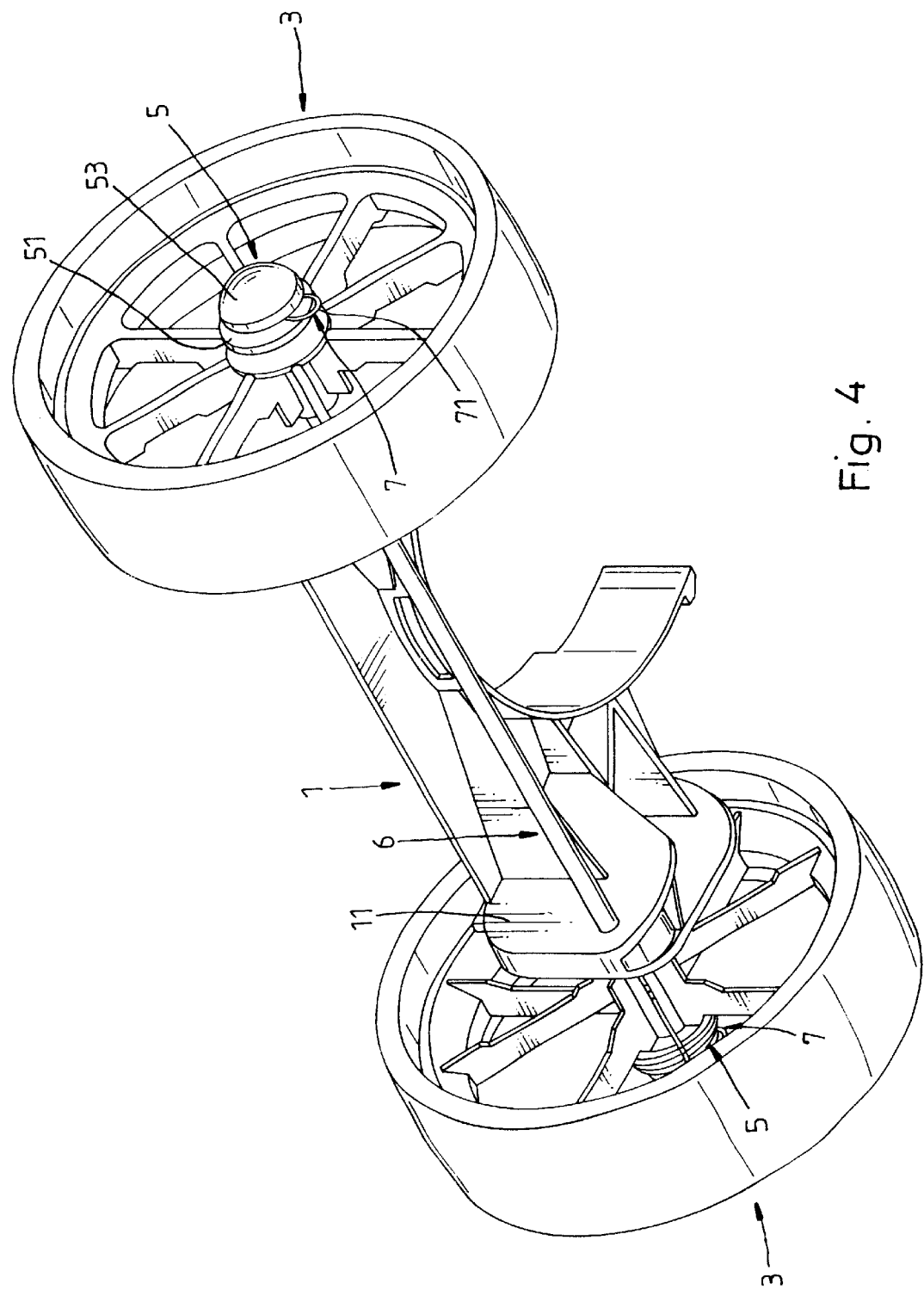
FIG. 4 is an elevational assembly view of the wheel structure for golf bag according to the present invention.
Figure 5:
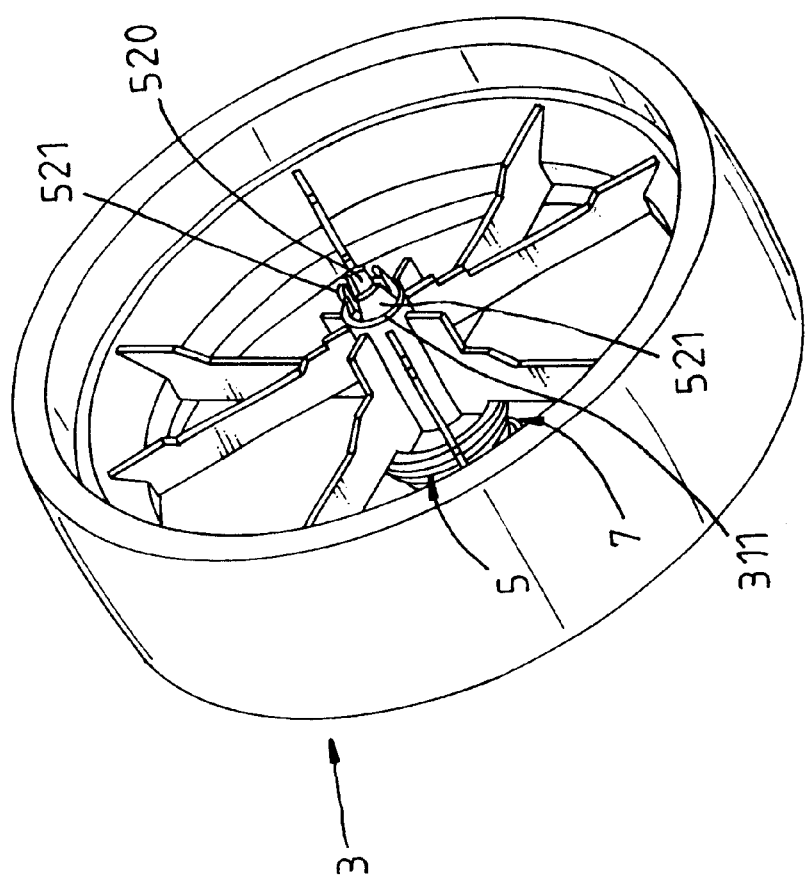
FIG. 5 is an elevational view of a part of the present invention, showing the connector fastened to the center axle hole of the corresponding wheel.
Figure 6:
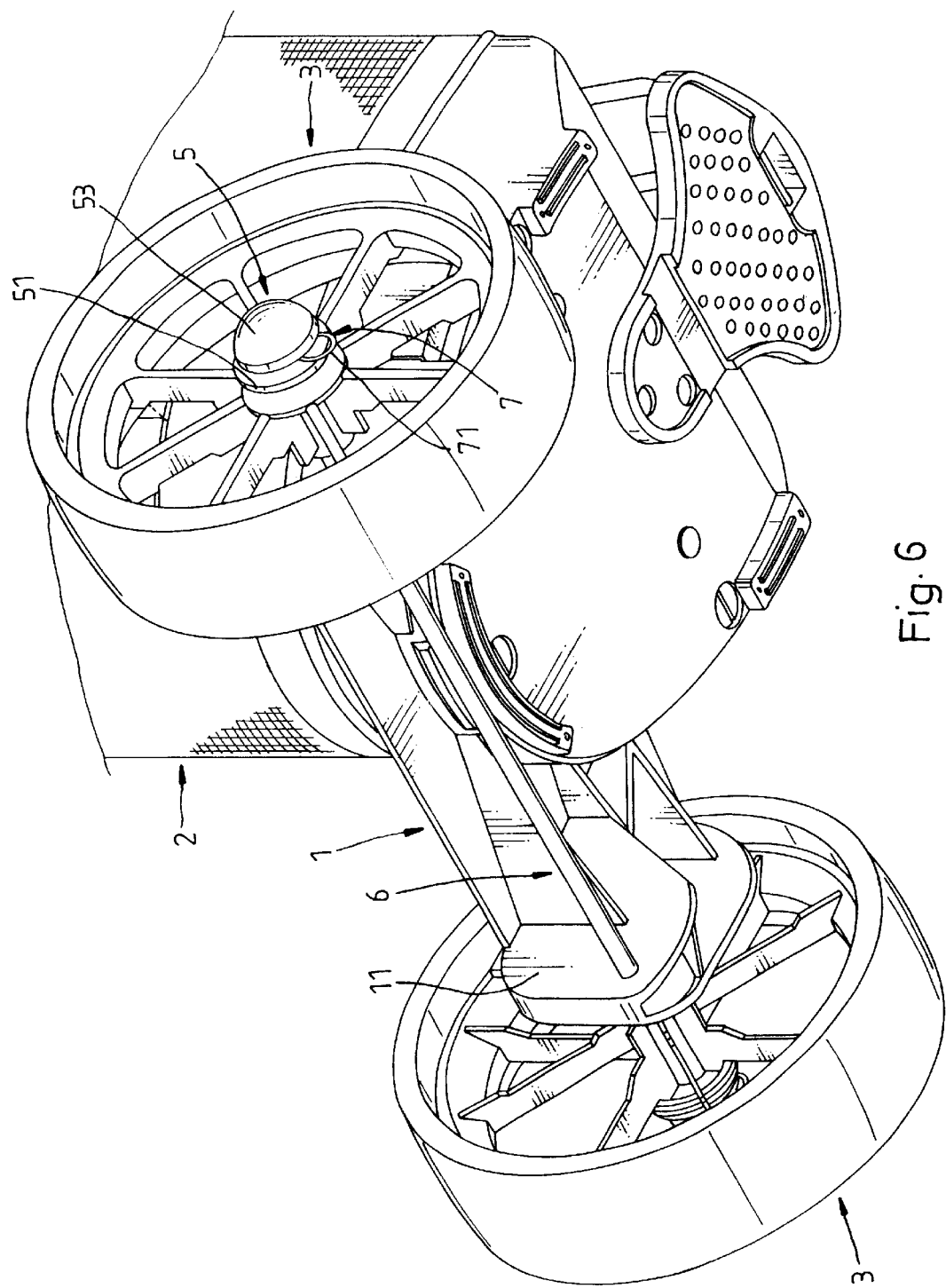
FIG. 6 is an applied view of the present invention showing the wheel structure fastened to the bottom cuff of a golf bag.
Figure 8:
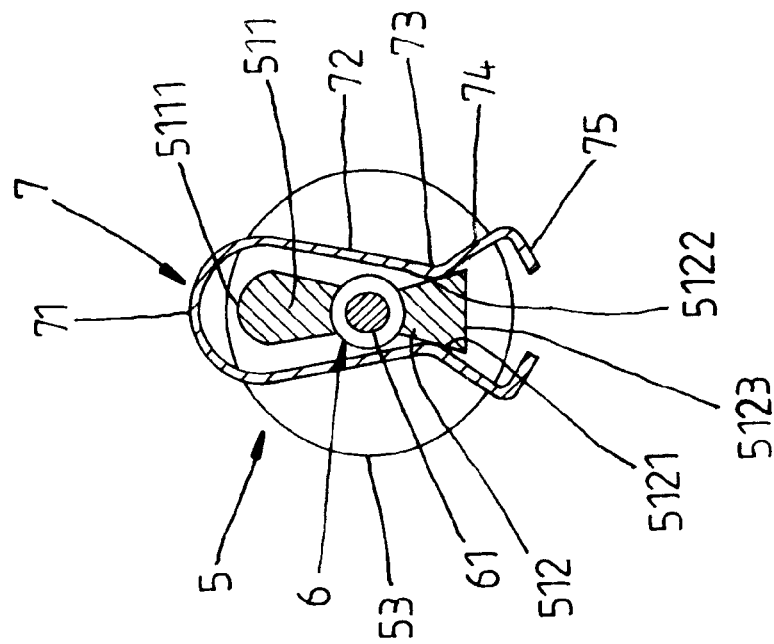
FIG. 8 is similar to FIG. 7 but showing the clamp forced downwards and disengaged from the wheel axle.

Referring to FIGS. 3~8, a wheel structure for golf bag in accordance with the present invention is shown comprised of a wheel bracket 1, two wheels 3,.two connectors 5, a wheel axle 6, and two clamps 7.

The wheel bracket 1 is connectable to the bottom cuff of a golf bag 2 (see FIG. 6), having two side frames 11 arranged in parallel at two sides and two axle holes 111 respectively formed in the side frames 11 and axially aligned.

The wheels 3 each have a center axle hole 31 for receiving the connectors 5 respectively and a longitudinal locating rib 32 located in the center axle hole 31.

The connectors 5 each comprise a tubular connector body 52 for insertion through the center axle hole 31 of one wheel 3, and a head 51 formed integral with one end of the connector body 52. The tubular connector body 52 has an axial hole 520, a plurality of longitudinal splits 522 respectively extended to the free end remote from the head 51, and a plurality of hooked portions 521 formed in the free end and spaced by the longitudinal splits 522 around the axial hole 520. When the connector body 52 of one connector 5 inserted through the center axle hole 31 of one wheel 3, the hooked portions 521 are hooked on the inner end edge 311 of the axle hole 31 of the corresponding wheel 3 (see FIG. 5), and the inner side 510 of the head 51 of the respective connector 5 is stopped at the outer end edge 312 of the corresponding wheel 3. Further, the tubular connector body 52 has a longitudinal locating groove 523, which is forced into engagement with the longitudinal locating rib 32 of the corresponding wheel 3 after insertion of the tubular connector body 52 into the center axle hole 31 of the corresponding wheel 3.

The wheel axle 6 is inserted through the axle holes 111 of the side frames 11 of the wheel bracket 1, having two tapered guide ends 62 and two annular grooves 61 extended around the periphery and respectively disposed adjacent the tapered guide ends 62.

The main features of the present invention are outlined hereinafter with reference to FIGS. 3~8 again. Each connector 5 further comprises an upper spacer block 511 and a lower spacer block 512 outwardly protruded from the outer side of the head 51 (see FIG. 7), and an outer cap 53 fixedly connected to the spacer blocks 511 and 512 and arranged in parallel to the head 51. The spacer blocks 511 and 512 are spaced from each other at a distance, each having a relatively broader outer end and a relatively narrower inner end for the mounting of one of the clamps 7. Each clamp 7 comprises a smoothly arched control portion 71, two middle retaining neck portions 73, two bearing portions 72 respectively connected between the ends of the smoothly arched control portion 71 and the middle retaining neck portions 73, two end portions 75 respectively aimed at each other, the end portions 75 each having a free end facing each other and spaced by an opening 70 and a fixed end, and two positioning portions 74 obliquely outwardly extended from the middle retaining neck portions 73 and the fixed ends of the end portions 75. When fastening one clamp 7 to one connector 5, aim the opening 70 of the respective clamp 7 at the outer end 5111 of the upper spacer block 511 of respective connector 5, and then apply a pressure to the control portion 71 to force the end portions 75 downwards along two opposite lateral sides of the upper spacer block 511 and the two opposite lateral sides 5121 and 5122 of the lower spacer block 512 into engagement with the outer end 5123 of the lower spacer block 512 (see FIG. 7). At this time, the middle retaining neck portions 73 are stopped between the upper spacer block 511 and the lower spacer block 512, and the bearing portions 72 are respectively stopped at the two opposite lateral sides 5121 and 5122 of the lower spacer block 512 (see FIG. 7).

Figure 7:
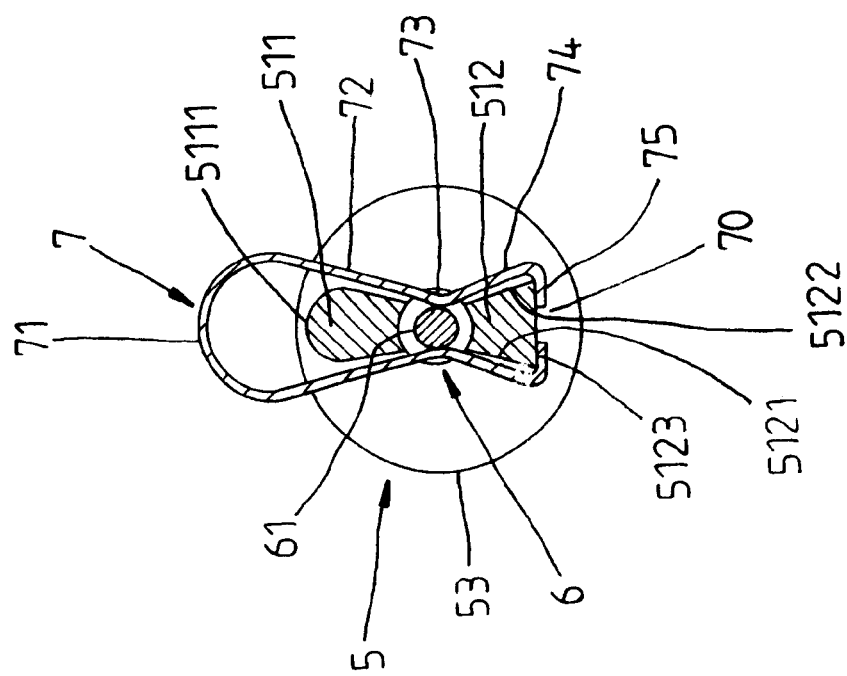
FIG. 7 is a sectional view of a part of the present invention showing the clamp fastened to the corresponding connector and secured to the annular groove at one end of the wheel axle.

After installation of the wheel axle 6 in the wheel bracket 1 and the connectors 5 in the wheels 3 and the clamps 7 in the connectors 5, the wheels 3 can then be fastened to the wheel bracket 1 by: inserting the tapered guide ends 62 of the wheel axle 6 through the axial hole 520 of the tubular connector body 52 of each of the connectors 5 into the space in between the middle retaining neck portions 73 of each of the clamps 7 respectively, for enabling the middle retaining neck portions 73 of each of the clamps 7 to be respectively forced into engagement with the annular grooves 61 of the wheel axle 6 (see FIG. 7).

On the contrary, when removing the wheels 3 from the wheel bracket 1, force the control portion 71 of each clamp 7 downwards relative to the corresponding connector 5 to force the middle retaining neck portions 73 outwards along the two opposite lateral sides 5121 and 5122 of the lower spacer block 512, and therefore the middle retaining neck portions 73 are disengaged from the annular grooves 61 of the wheel axle 6 (see FIG. 8), for enabling the wheels 3 to be respectively removed from the wheel bracket 1.

Although the present invention has been explained in relation to its preferred embodiment, it is to be understood that many other possible modifications and variations can be made without departing from the spirit and scope of the invention as hereinafter claimed.

What is claimed is:

1. A wheel structure for golf bag comprising:

a wheel bracket connectable to the bottom cuff of a golf bag, said wheel bracket having two side frames arranged in parallel at two sides and two axle holes respectively formed in said side frames and axially aligned;

a wheel axle inserted through the axle holes of said wheel bracket, said wheel axle having two tapered guide ends and two annular grooves extended around the periphery thereof and respectively disposed adjacent said tapered guide ends;

two wheels, said wheels each having a center axle hole and a longitudinal locating rib located in said center axle hole;

two connectors adapted to secure said wheels to said wheel axle, said connectors each comprising a tubular connector body inserted through the center axle hole of one of said wheels, and a head formed integral with one end of said connector body and stopped at an outer end of the center axle hole of the corresponding wheel, said tubular connector body having an axial hole adapted to receive one end of said wheel axle, a plurality of longitudinal splits respectively extended to one end thereof remote from said head, a plurality of hooked portions spaced by said longitudinal splits around said axial hole and hooked on an inner end edge of the center axle hole of the corresponding wheel, and a longitudinal locating groove forced into engagement with the longitudinal locating rib of the corresponding wheel;

wherein said connectors each further comprise an upper spacer block and a lower spacer block outwardly protruded from an outer side of the respective head and an outer cap fixedly connected to said spacer blocks and arranged in parallel to the respective head, said upper spacer block and said lower spacer block being spaced from each other at a distance, each having a relatively broader outer end and a relatively narrower inner end;

two clamps for fastening to the upper and lower spacer blocks of said connectors to secure said wheel axle to said connectors, said clamps each comprising a smoothly arched control portion for operation control by hand, two middle retaining neck portions adapted to engage one annular groove of said wheel axle to secure said wheel axle to the corresponding connector, two bearing portions respectively connected between two ends of said smoothly arched control portion and said middle retaining neck portions, two end portions respectively aimed at each other, said end portions each having a free end facing each other and spaced by an opening and a fixed end, and two positioning portions obliquely outwardly extended from said middle retaining neck portions and the fixed ends of said end portions.

* * * * *